March 13, 1956   H. S. ALLISON ET AL   2,737,859
BAG MAKING MACHINE
Filed Feb. 28, 1952   5 Sheets-Sheet 1
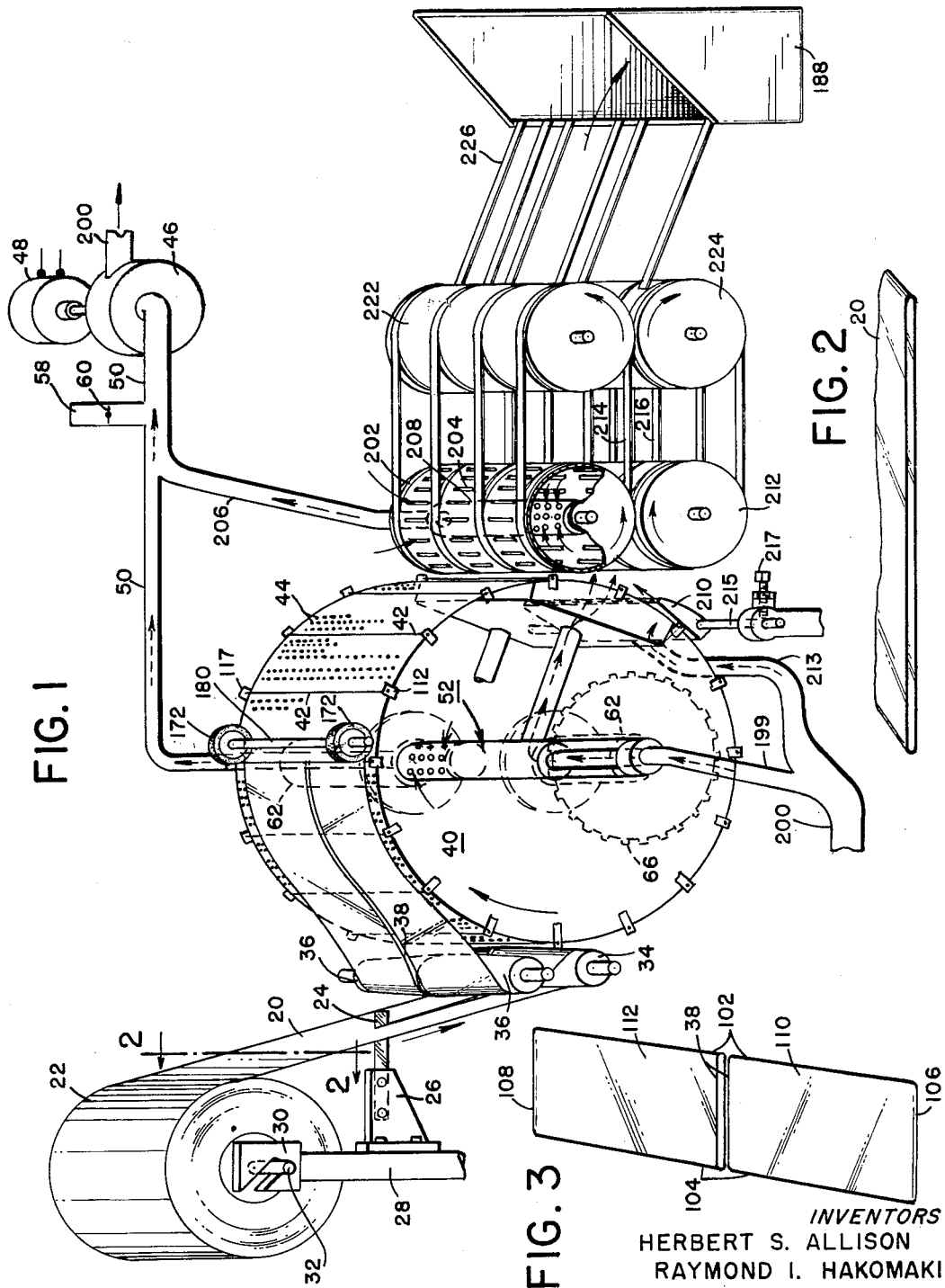
INVENTORS
HERBERT S. ALLISON
RAYMOND I. HAKOMAKI
FRANK B. JEWETT, JR.
BY William C. Strueber ATTORNEY March 13, 1956
H. S. ALLISON ET AL
2,737,859
BAG MAKING MACHINE
Filed Feb. 28, 1952
5 Sheets-Sheet 2
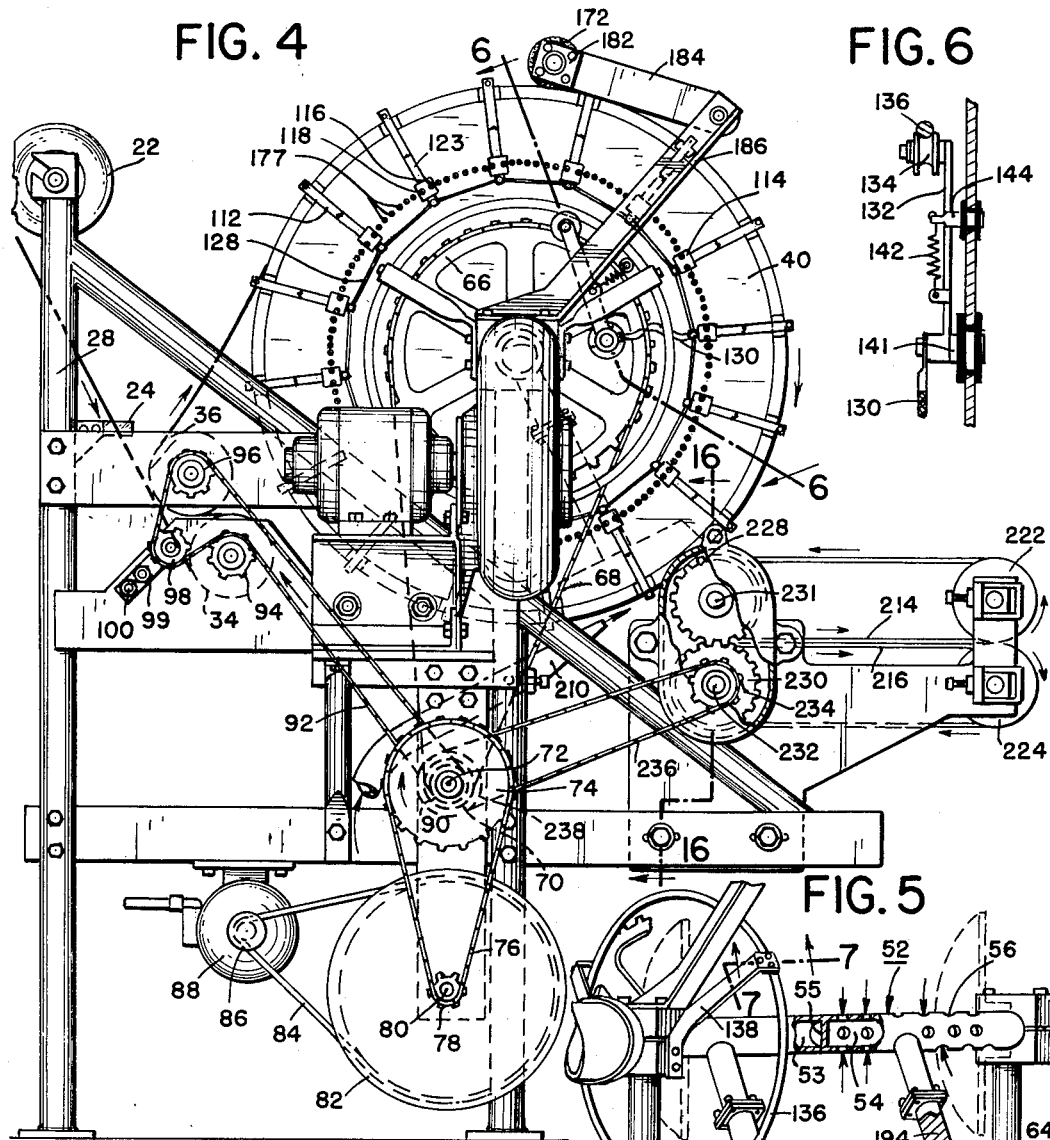
FIG. 4
FIG. 6
FIG. 5
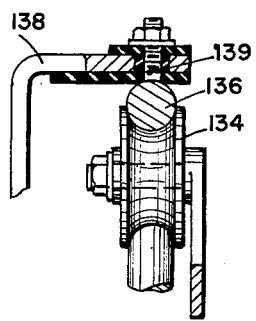
FIG. 7
INVENTORS
HERBERT S. ALLISON
RAYMOND I. HAKOMAKI
FRANK B. JEWETT, JR
BY *William C. Strieber* ATTORNEY

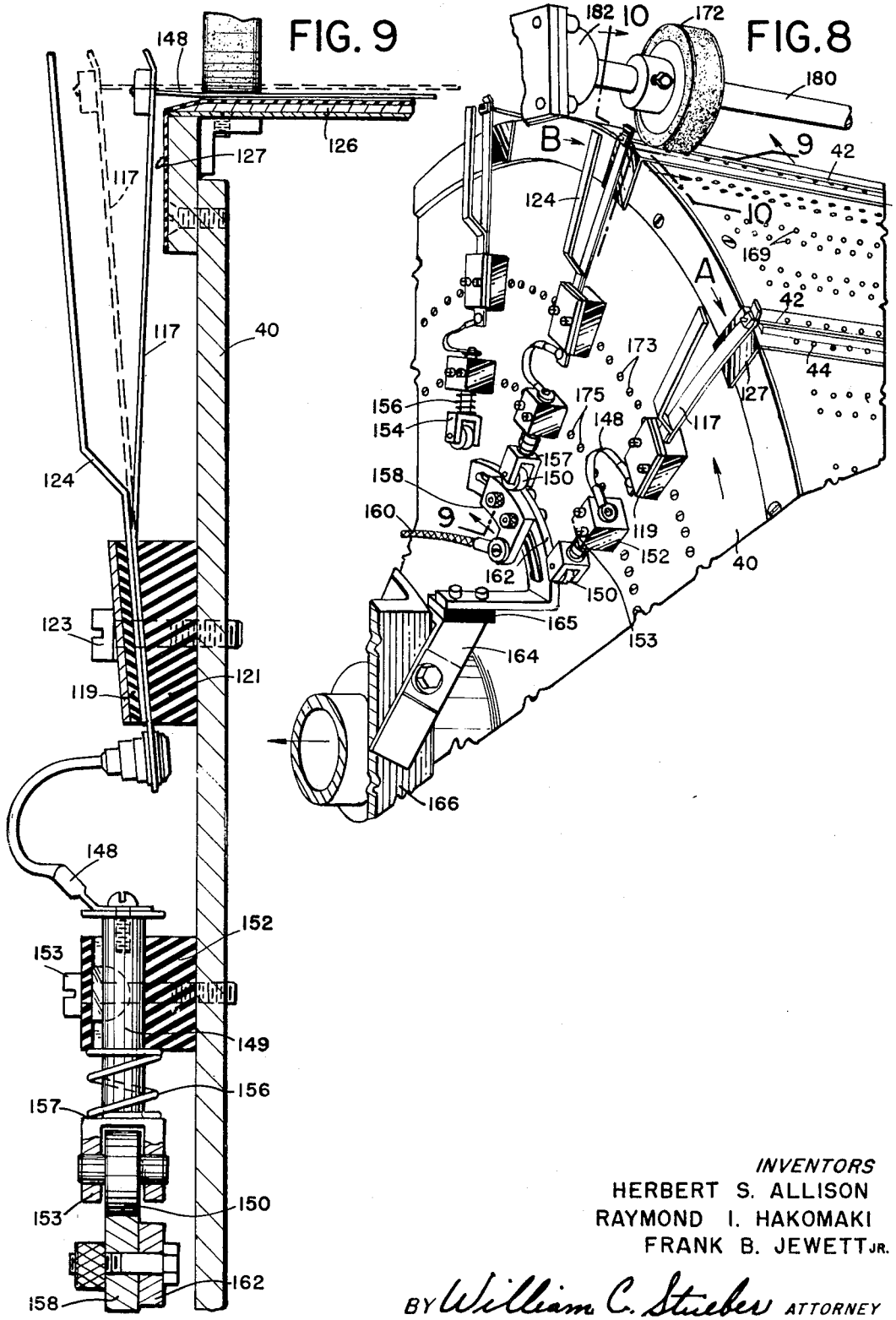

March 13, 1956　　H. S. ALLISON ET AL　　2,737,859
BAG MAKING MACHINE

Filed Feb. 28, 1952　　5 Sheets-Sheet 4

INVENTORS
HERBERT S. ALLISON
RAYMOND I. HAKOMAKI
FRANK B. JEWETT Jr.

BY William C. Stueber ATTORNEY

March 13, 1956　　H. S. ALLISON ET AL　　2,737,859
BAG MAKING MACHINE
Filed Feb. 28, 1952　　5 Sheets-Sheet 5

INVENTORS
HERBERT S. ALLISON
RAYMOND I. HAKOMAKI
FRANK B. JEWETT Jr.

BY William C. Strieber ATTORNEY

United States Patent Office 2,737,859
Patented Mar. 13, 1956

2,737,859

BAG MAKING MACHINE

Herbert S. Allison, Raymond I. Hakomaki, and Frank B. Jewett, Jr., Minneapolis, Minn., assignors to General Mills, Inc., a corporation of Delaware Application February 28, 1952, Serial No. 273,934

12 Claims. (Cl. 93—8)

This invention relates to improvements in methods and machines for making articles such as bags from thermoplastic material.

More specifically the invention relates to an improved method and machine for forming bags and the like from tubular thermoplastic material by passing multiple layers of the material over a cylindrical drum having spaced heated wires on the surface. The heated wires sever lengths from the thermoplastic material and seal together the severed edges to form a series of bags. The bags are thus formed in rapid fashion as the cylinder revolves and after being served and sealed are removed from the drum.

An object of the invention is to provide a method and mechanism which will very rapidly manufacture bags and the like of thermoplastic material thus requiring the provision of a minimum number of machines and reducing the necessary operating time and overall operating expense and hence reducing the unit cost of the product.

An object of the invention is to rapidly form bags and the like from multiple layers of thermoplastic material and to provide a machine and method which will insure that the bags will be completely sealed and not have points of leakage at the corners of the bags where the seams meet.

Another object of the invention is to provide a machine which is capable of making various sizes of bags making only minor adjustments and with the use of the same machine elements.

A still further object of the invention is to provide an improved method for removing the formed bags from the surface of the bag forming drum and delivering them to an improved conveyor, preventing the bags from accidentally sticking to the surface of the cylinder and injuring the machine or slowing down production of the bags.

Other objects and advantages will become apparent in the following specification taken in connection with the accompanying drawings in which:

Figure 1 is a perspective view of the forming machine having certain machine elements removed for clarity;

Fig. 2 is a sectional view taken along line 2—2 of Fig. 1 to illustrate the tubular shape of the material which is used with the preferred embodiment of the machine;

Fig. 3 is a perspective view of the material after it has been longitudinally severed and has been cross-severed and sealed to form a pair of bags;

Fig. 4 is a detailed side elevation of the forming machine;

Fig. 5 is a perspective view of the forming machine having the drum removed to illustrate the interior construction;

Fig. 6 is a sectional view taken along line 6—6 of Fig. 4 illustrating the mechanism for supplying electricity to the serving wires;

Fig. 7 is a sectional view taken along line 7—7 of Fig. 5 illustrating the detailed construction of the electrical roller contact for distributing electricity to the sealing wires;

Fig. 8 is an enlarged detail taken in perspective of a section of the forming drum to show the details of the sealing wires and the roller which presses the bag seam at the edge of the bag;

Fig. 9 is a sectional view taken along line 9—9 of Fig. 8 and illustrating the detailed construction of the support for the sealing wire and the electrical contacts;

Figure 10:
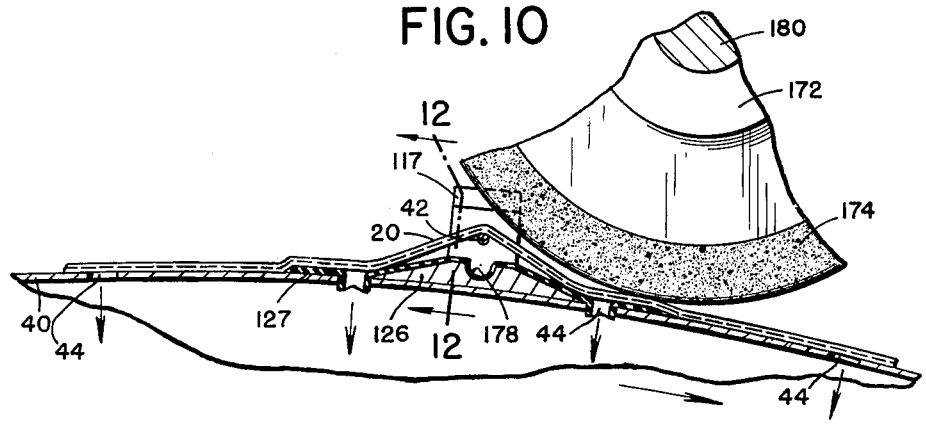
Fig. 10 is a greatly enlarged view taken in section along line 10—10 of Fig. 8.

The mechanism and method illustrated in the drawings, which show the preferred embodiment of the invention, operate to sever the end from a length of tubular thermoplastic material and simultaneously seal the opposing edges of the severed end. The product formed is an open ended bag or envelope comprise of facing rectangular sheets being joined along three sides and open at one end. In the formation of any such product one important objective is to obtain a device and method which are capable of forming the product at a high rate of speed making it possible to do a job with one machine when the product previously was formed at a slower rate with several machines, thus reducing the unit cost of the product. With the method shown in the present invention the machine manufactures two or more bags or envelopes with the formation of only a single cut across the material, and is capable of forming each operation at a very high rate of speed.

The machine uses tubular material such as pictured in Fig. 2, the material being indicated by the number 20. This material is stored on a roll 22 as illustrated in Fig. 1. As the material 20 is drawn from the roll it is advanced over a knife 24 which extends into the path of the material at a midpoint between two edges and which longitudinally divides the material into two separate lengths. The knife is supported on a bracket 26 which is secured to a vertical post 28 supporting the bearings 30 in which the shaft 32 of the material carrying roll 22 rotates.

As is shown in Figs. 1 and 4, the material longitudinally severed by the knife 24, passes downwardly over a feed roll 34 and upwardly over a second feed roll 36. These two feed rolls are constantly driven to feed the tubular thermoplastic material to a bag forming cylindrical drum 40.

It is to be noted that the two feed rolls are crowned at their center, or in other words have a larger diameter at the central portion than at the ends. This shape of the rolls functions, as the thermoplastic material passes over the rolls, to spread the two separate lengths which were cut by the knife 24. A space 38 is formed between the two lengths which prevents them from adhering to each other when the material is cross severed by the use of a heated wire.

At intervals spaced from the surface of the drum 40, are carried the severing and sealing wires 42. The cylindrical drum 40 is hollow and has rows of holes or perforations 44 in its surface which serve to hold the material against the surface as a vacuum is created therein.

The vacuum is created within the drum by a suction fan 46 suitably driven by a motor 48 as shown in Fig. 1. To the intake of this fan is connected a pipe 50, which leads to a fixed hollow hub 52 extending through the axial center of the cylindrical drum. The hub 52, Fig. 5, is divided into a pressure end 53 and a suction end 54, the ends being separated by a bulkhead 55. The suction end 54 has perforations 56 creating a suction within the drum and permitting a flow of air into the pipe 50 as it is sucked by the fan 46. The purpose of end 53 will later be described.

An opening 58 leads into the pipe 50 and has a damper 60 mounted therein which is adjustable to vent the pipe to atmosphere and thereby to control the suction within the forming drum.

The cylindrical drum is rotatably mounted on bearings 62 at the ends of the hollow hub. The bearings are suitably supported with the hub at the top of standards on either side of the machine 64 which form part of the main framework of the machine.

The drum 40 and the feed rollers 34 and 36 are driven to have the same peripheral speed to facilitate the smooth flow of the thermoplastic tubular material. To drive the drum, a sprocket 66 is suitably secured thereto and carries a drive chain 68, Fig. 4, which passes over a sprocket 70 which is suitably secured to a shaft 72, rotatably mounted on the frame. This shaft and the sprocket 70 are driven by sprocket 74 over which passes a chain 76 which also passes over a sprocket 78 secured to shaft 80. Secured to shaft 80, to drive it and the sprocket 78, is a pulley 82 which is driven by a belt 84 which in turn is driven by pulley 86. This pulley is carried by the motor 88 which is suitably mounted on the framework.

The driven shaft 72 also carries the sprocket 90 which drives a chain 92. This chain passes over sprockets 94 and 96 which drive the drive rollers 34 and 36 respectively. A tightener sprocket 98 rotates on a bracket 99, adjustably secured to the frame by bolts 100, and serves as a tightener for the chain 92.

As the longitudinally severed thermoplastic material is carried over the drum 40, it is sucked thereagainst by the vacuum within the drum. This draws the material tightly against the wires 42 which extend across the drum surface. With the material thus contacting the wires, they are briefly heated and the heat melts the thermoplastic to sever the material. The heat also fuses the material at the severed edges and forms a seam or welded bead which welds the severed edges together. Thus the upper and lower layers of material are joined by a seam. The material, with a seam 102 formed at one edge, and with a seam 104 at the other edge, is illustrated in Fig. 3. As the drum rotates each of the succeeding wires is heated and performs the same severing and sealing operation forming a seam each side of the wire. The side edges 106 and 108 of the two layers of material (Fig. 3) are joined because the material was originally tubular in form. Thus it will be seen that two bags 110 and 112, are simultaneously formed, with their open ends facing each other. With each heating of the sealing wire an additional pair of bags is formed.

It will readily be understood that if the drum were wider, several additional lengths of tubular thermoplastic material could be simultaneously run over the drum and thus a series of pairs of bags would be formed at the same time. For example, if two strips of tubular material were run over the drum and each longitudinally severed, four bags would be formed with one cross sealing and severing operation.

It will further be recognized that it is not necessary to longitudinally sever the strip of tubular material by the knife 24. If the knife 24 were omitted, rectangular envelopes the width of the tubular material would be formed, which would be completely sealed on all sides. Such fully sealed rectangular envelopes are useful for various purposes. Very large bags may be formed by cutting each envelope laterally, the cut running parallel to and between the sealed edges. The width may be varied by choosing tubular material of a different width and the length varied by adjusting the spacing between wires. The manner of making this space adjustment will later be described.

Since the sealing and severing operation by the heated wires takes a brief moment of time, the wires need be only briefly heated. This gives the molten thermoplastic seam at the edge of the bag adequate time to cool and solidify.

To briefly heat the wires, electricity is fed to them for only a few degrees of their rotation with the drum. Referring to Figs. 4, 8, and 9, the mounting of the wires is shown in detail. Fig. 4 illustrates the mounting on one side of the drum and Figs. 8 and 9 on the other side. The mounting of the cutting and sealing wires is similar for the two sides except that on the right side, as shown in Fig. 4, the wires are continually connected to an electrical source through a circular commutator ring, Figs. 6 and 7, and on the left side intermittently connected by a commutator segment, Figs. 8 and 9.

On the right side of the drum, Fig. 4, the wires 42 are suitably supported on resilient arms 112 which are mounted at their bases on an insulating block 114 which electrically insulates the arm from the drum. The arms are held against the insulating material by a cap 116, Fig. 4, which is secured over the insulating material by screws 118. The screws extend through the insulating material into threaded holes in the sidewalls of the drum. Similar arms 117 support the wires on the other side of the drum, as is shown in Figs. 8 and 9. These arms are supported by caps 119 of insulating material clamped over an insulating block 121 by screws 123. The arms are thus electrically insulated from each other and from the drum. The arms 112 and 117, which support the wires, are made resilient so as to permit the expansion and contraction of the wires as they are alternately heated and cooled. As is shown in the "A" position of Fig. 8, and the solid line position of Fig. 9, the arm 117 is close to the sidewall of the drum 40 when the wire is in that position and is not heated. The arm moves away from the drum when the wire 42 expands and is heated as it receives electricity from the commutator segment 162, at position "B." The expanded heated wire lets the resilient arm move away from the side of the drum but the wire stays taut as the resilient arm pulls it outwardly. Additional guard arms 123 and 124 are positioned outside 112 and 117.

A strip of insulating material 126 such as plastic is attached to the surface of the drum beneath each of the wires, and insulating tape 127 is placed over each strip of material and extends down against the side of the drum. The tape ends prevent the leaf 112 from shorting when it nears the sides of the drum, as may be observed in Fig. 9. If the tape is of such a width that it covers the holes 44, holes are poked in the tape, Figs. 10 and 11, such as by a sharp pointed instrument.

Turning now to the connections which supply electricity to the wire, a continual connection from an electrical source of power is made on the front side of the drum by means of a roller 134 which is in contact with an annular commutator ring 136. A connector wire 128 connects all the supporting arms 112 around the drum. From this connector wire a lead 130 connects to an arm 132. The arm 132 carries at its outer end the roller 134 as is shown in detail in Figs. 6 and 7. The roller rides in engagement with the annular ring 136 which is suitably mounted by arms 138, Fig. 5, on the frame to be concentric with the rotation of the arm 138. Studs 139, Fig. 7, extend through insulated holes in the arms 138 to support the ring and insulate it from the supporting arms. An electrical lead 140, secured to and insulated from the frame (Fig. 5), is connected to a terminal 139 on the commutator ring 136 and connects to a suitable source of electricity. The arm 132 is pivotally mounted on the drum on an insulated spindle 141. The arm is urged in a pivotal direction so that the roller 134 will remain in engagement with the commutator ring 136. This is done by a spring 142 connected between the arm and an insulated boss 144 on the drum.

The circuit partially formed by the leads just described, is intermittently completed to heat the wires. To this end, rollers 150 on the left side of the drum intermittently engage a commutator bar 162 which is mounted stationary beside the revolving drum. As is shown in Figs. 8 and 9, a wire 148 is connected to the lower end of the arm 112 and is also connected to a plunger 149 which is slidably and non-rotatably mounted in an insulating block 152 secured to the side of the drum screws 153. A roller 150 is rotatably mounted between the split lower ends 153 of the plunger. A spring 156 is compressed between the block 152 and a shoulder 157 of the plunger to urge the roller to engagement with the commutator bar 158. A lead 160 electrically connects the bar to the source of electricity. The bar is secured to a slotted bracket 162 and is arcuately adjustable to control the point in the rotation of the drum when the roller will engage the bar. Thus the length of time the wire will heat before the drum carries it under the roller 172, Fig. 8, is adjustable. The bracket 162 is mounted on another bracket 164 which is secured to the main frame 166 and insulated. An insulating block 165 is placed between said brackets.

Thus, as the drum rotates, the rollers 150 are carried along until they engage the commutator segment 158, at which time the circuit is completed through the severing wire 42. This heats the wire and causes it to melt with the thermoplastic material in engagement therewith. The material is, of course, held tightly against the drum surface and against the wires by the vacuum within the drum.

The length of material cut from the end of the thermoplastic is equal to the distance between the wires. If it is desirable to have narrower bags manufactured, additional wires are mounted on the surface of the drum along with additional rollers such as 150 to contact the commutator bar 158. If wider bags are wanted, wires and their rollers are removed. The removal of wires is done by removal of the supporting arms 117 and 112 from the opposing sides of the drum. This is done by removal of the screws 123 and 118 to remove the insulating blocks 121 and 114, and by appropriately disconnecting the lead wire 148 and the block 114 from the wire 128.

Figure 11:
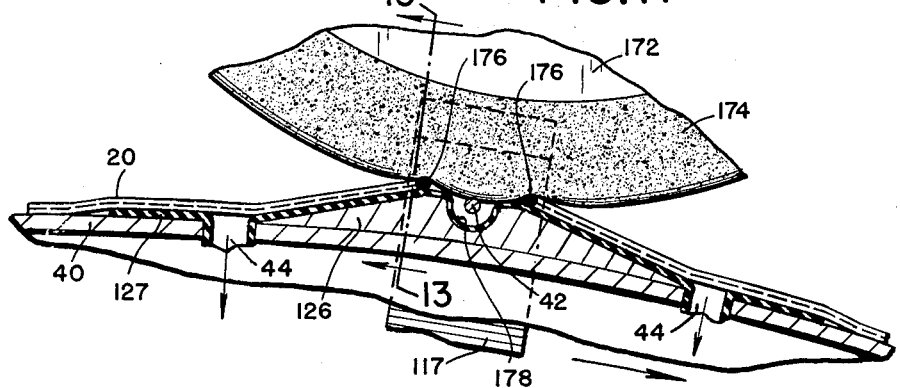
Fig. 11 is another view of Fig. 10 showing the drum slightly advanced from its position in Fig. 10.

To add wires, additional supporting arms are secured to the sides of the drum. The wires are positioned so that they will extend between two rows 169 of holes 44 as do the wires which are shown in the drawings. Therefore, as many wires may be added as there are pairs of rows of holes. The holes, being positioned on either side of the wire, cause the material to be sucked tightly to the wire insuring quick cutting when the wire is heated and cause the edges of the bags to be held after the bags are severed from the material. This effect is shown in Fig. 11.

If the bags are to be made half as wide as those made with the apparatus shown, wires are mounted between the wires on the drum. In Fig. 8, the extra wire will extend between the two rows 169 of holes. Additional insulating blocks will have to be provided on each end to support the extra arms, similar to blocks 121 and 116. Additional contacting rollers similar to 150 and associated mechanism will also be added. To permit attaching these to the side of the drum, additional threaded holes are located in each side, such as is shown at 173 and 175 in Fig. 8 and at 177 in Fig. 4. As many of these holes are provided as there are pairs of rows of holes on the surface as one sealing wire can be provided for each double row of holes. To complete the alteration for smaller bags, strips of insulation are attached to the drum surface under the wires.

It follows that, if the bags are to be made one-fourth as wide, three wires will be position, evenly spaced, between the wires shown, or one wire between each pair of rows of holes on the drum. Further, if bags of varying sizes are to be made in one run, some of the wires may be relocated so that distances between various wires are not the same.

Figure 12:
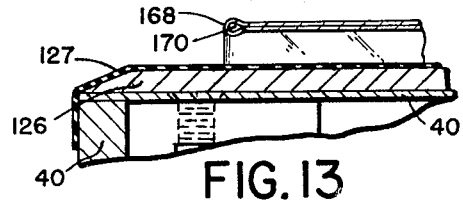
Fig. 12 is a sectional view taken along line 12—12 of Fig. 10 and illustrating the loop which is present at the edge of the tubular material.

Since the material used is tubular, the side edges between the upper and lower layers of the material form a loop. This loop 168 is shown in detail in Fig. 12. As the severing and sealing wire is heated and melts its way through the thermoplastic material, the molten material formed at the edges flows together to form a bead along the severed edge of the material. The opening 170 at the edge of the loop is normally too wide for the molten material to bridge. If the seam formed along the edge of the bag extended only to this loop 170 and did not bridge the gap, the bag would leak at that corner. In order to prevent this, a device is provided to press the material together during and after the time the seam is heated. This closes the loop 170, flattening the layers and forcing the edges together.

Figure 13:
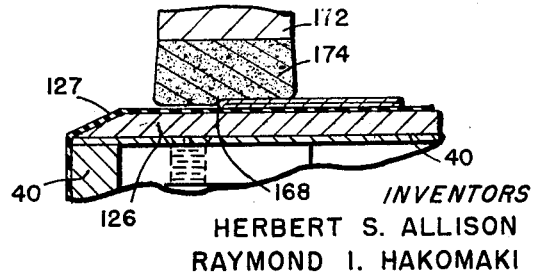
Fig. 13 is a sectional view taken along line 13—13 of Fig. 11 illustrating how the loop shown in Fig. 12 is pressed to insure that a non-leaking seam will be formed.

The pressing device provided is a roller 172 having a soft outer surface 174. This soft outer surface should be of heat resistant material, such as silicon rubber or the like. The action of the roller, pressing together the layers to insure forming the seam to the edge of the material, is shown in detail in Fig. 13. The gap 170 at the edge of the material is completely closed and the molten material will form the seam completely to the edge.

The action of the roller 172 is shown in further detail in Figs. 10 and 11. As the drum 40 rotates to the right, the soft outer surface 142 is in engagement with the bag material. The position of the roller and the drum is shown in Fig. 10 just before the wire 42 is heated. In Fig. 11 the wire 42 has been heated and the thermoplastic material 20 has been melted back by the heat of the wire and beads 176 are formed. The amount of material melted back and the relative sizes of the material and wire are greatly exaggerated for purposes of clarifying the drawing in these Figures. It will be noted that the roller surface 174 presses downwardly on the bead pushing it together.

The insulating material 126, which is on the surface of the drum beneath the wires, is raised above the surface of the drum so that the beads formed on the material edge will be tightly pressed beneath the roller 174. The insulating material 126 has a groove 178 positioned beneath the sealing wire 42 so that the sealing wire may be forced down in this recess as the roller passes over.

Figure 14:
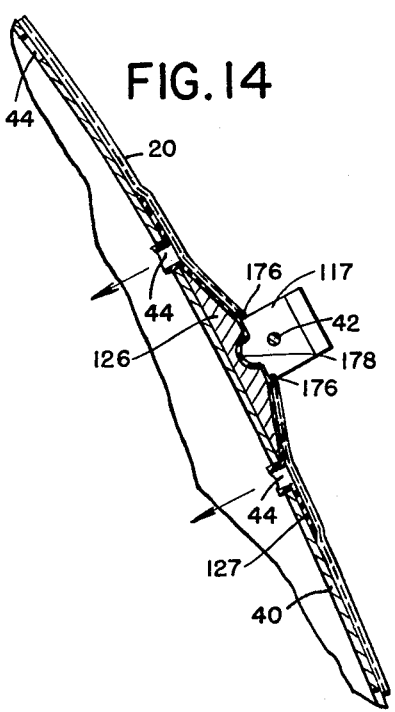
Fig. 14 is another view of Figs. 10 and 11 showing the relative position of the bags and the sealing wire after the tubular thermoplastic material has been servered and the severed edges sealed.

After the roller passes, the wire 42 springs back to its normal position. The thermoplastic material has been severed with seams formed connecting the severed edges of the layers of material as shown completed in Fig. 14. The holes 44 in the surface of the drum are positioned so that a row extends on either side of the wire exposing the edges of the bags to the vacuum within the drum to hold the bag edges tightly against the drum surface.

As shown in Fig. 1, there are two rollers 172 each one positioned at the doubled edge of the tubular material. The rollers are mounted on a cross shaft 180 which is rotatably mounted in bearings 182 at the ends of the shaft. The bearings are carried at the end of pivotally mounted arms 184 which are secured to the end of a radially extending bracket 186 secured to the framework of the machine. The arm 184 is freely mounted so that the weight of the arms and rollers 172 with their associated mechanism causes the rollers to bear down against the material on the drum as it rotates.

After an end has been severed from the thermoplastic material and the seams formed, the bags are carried downwardly on the surface of the drum while the thermoplastic seams harden.

Figure 15:
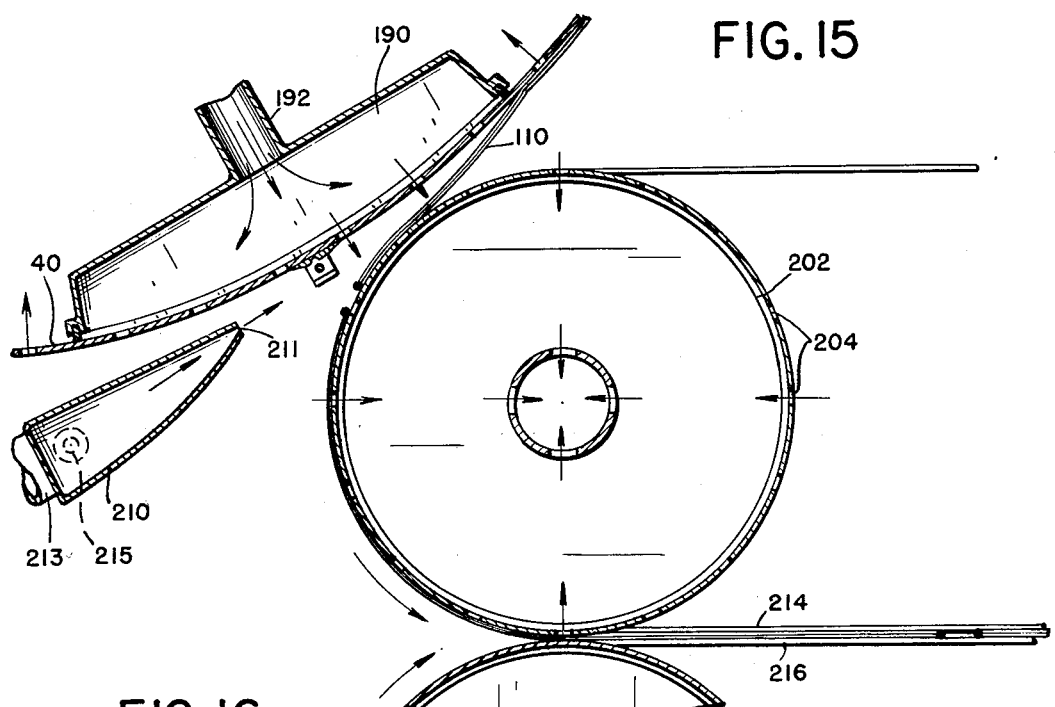
Fig. 15 is a vertical section greatly enlarged showing the details of the mechanism for removing the bags from the bag forming cylinder.

A mechanism is provided to remove the bags from the drum and deposit them in a container 188 as shown in Fig. 1. To dislodge the bags from the surface of the drum where they have been held by the vacuum, air is blown outwardly through the holes of the drum at the desired location of dislodgment. To accomplish this a pressure chamber 190, Figs. 5 and 15, is provided and is filled with pressurized air which blows outwardly through the drum surface. This chamber 190 is mounted within the drum and is closely adjacent the inner surface. The chamber is supported on arms 192 and 194 extending radially from the hub 52. The arm 192 is hollow and leads into the chamber 53 in one end of the hub 52. To pressurize this chamber 53 a tube 199 connects between the chamber and the outlet 200 of the blower 46 which is the same blower which provides a vacuum for the drum.

Air blowing outwardly from the chamber 190 dislodges the bags from the surface of the drum and blows them against a hollow roller or cylinder 202, Figs. 2, 15, 16 and 17. This roller has slots 204 in the surface and has a vacuum within it so that it will suck the bags against its surface. A pipe 206 leads between the vacuum line 50 and a perforated shell 208 within the roller 202.

To insure that the forward end of the bag will be first removed from the drum and directed against the roller 202, separator 210 having air jets 211 is provided, Figs. 1, 4, 5 and 15. Air for the jets is fed in through a tube 213, which connects it to line 200. The separator having the jets directs its air tangentially to the surface of the drum and against the movement of the bags to separate the leading edge from the drum and direct it against the hollow roller 202. The combined motion of the air from the pressure chamber 190 and from the jet 210 forcibly carries the bags 110 against the roller 202 where they become attached by virtue of the suction within the roller. The bags are then carried downwardly around the roller 202 and between it and a lower roller 212. The separator has supporting trunnions 215 mounted in a framepiece so as to be rotatably adjustable to adjust the direction of the air jets. Set screws 217 lock the trunnions in adjusted position.

Both of these rollers 202 and 212 carry conveyor belts 214 and 216 respectively. The conveyor belts, shown in Fig. 1, are separated from each other to permit the placement of the slots 204 in the roller 202. The belts run in grooves 218 and 220 in the surface of the rollers, thus making the outer surface of the belts flush with the roller surface. The upper and lower belts are carried on their other ends by similarly grooved rollers 222 and 224. As the bags are held between the belts, they are peeled off the upper drum 202 and carried by the belts onto a chute 226 whereupon they slide by gravity into the container 188.

Figure 16:
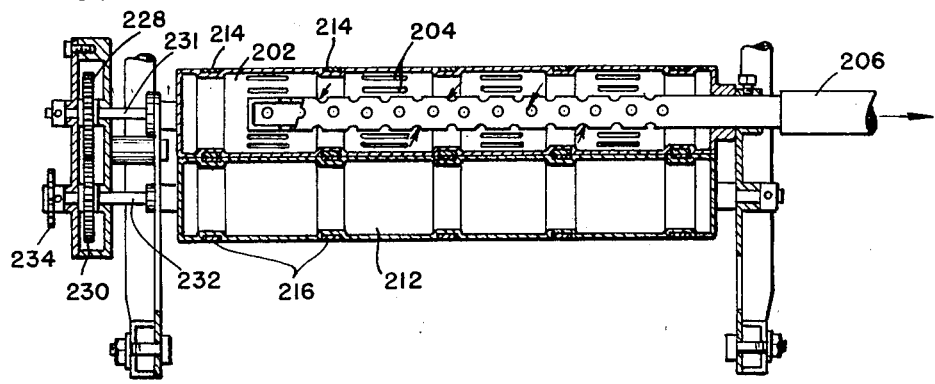
Fig. 16 is a sectional view taken along line 16—16 of Fig. 4 illustrating the interior construction of the cylinder for removing the bags from the bag forming drum.
Figure 17:
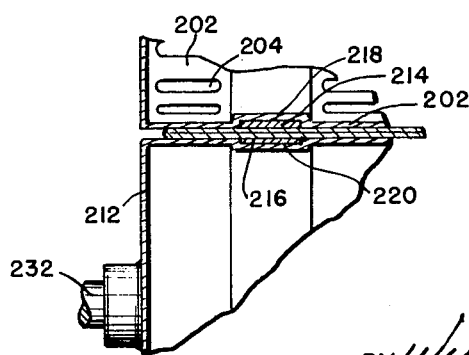
Fig. 17 is a greatly enlarged detailed portion of Fig. 16 showing the bag as carried between the rollers which remove it from the bag forming drum.

The rollers and conveyor belts are driven to have the same peripheral speed as the bag forming drum. To drive the conveyor belts and rollers, meshing gears 228 and 230 are carried on the ends of the shafts 231 and 232, carrying the rollers as shown in Figs. 4 and 16. The lower shaft 232 carrying roller 212 has a sprocket 234 over which runs a chain 236 which is driven by sprocket 238 carried on a shaft 72.

Thus it will be seen that we have provided a machine for automatically forming bags and the like from tubular material which is capable of operating at high speeds. The machine will form bags of uniform size and quality which will be completely sealed and the possibility of leaks being present at the end of the seam has been obviated. The bags are surely and rapidly removed from the drum as they are made to permit constant rapid operation of the machine. The machine is readily adaptable to making bags of various sizes or to making completely sealed envelopes of thermoplastic material.

We have, in the drawings and specification, presented a detailed disclosure of the preferred embodiment of our invention, but it is to be understood that as the invention is susceptible of modifications, structural changes and various applications of use within the spirit and scope of the invention, we do not intend to limit the invention to the specific form disclosed but intend to cover all modifications, changes and alternative constructions and methods falling within the scope of the principles taught by our invention.

We claim as our invention:

1. A mechanism for forming bags of tubular thermoplastic material which comprises means for advancing a multilayered sheet of thermoplastic material having the side edges joined, a knife for severing the layers of material along their lengths, means for separating the severed edges to prevent them from contacting and adhering together at their corners when heated, and means for applying a heated sealing and severing member at spaced intervals across the material to form pairs of bags open on their facing ends.

2. A mechanism for forming bags from multiple thickness sheets of thermoplastic which comprises a severing knife positioned in the path of tubular thermoplastic material, a feed roller for drawing the material forward over the knife to divide it into two sections, the roller having a larger diameter at the midportion than at the ends to separate the sections of material, and a drum over which the material passes having mounted thereon spaced heated wires positioned to sever ends from the material and seal the severed edges of the lengths to form a pair of bags with each severing action of a wire, the bags having been separated to prevent the ends from adhering to each other.

3. The method of forming bags from a supply of multiple layered thermoplastic material which comprises longitudinally severing the multiple layered material to form twin lengths, separating these lengths of material to form a space between them, and applying a heated sealing and severing wire across the material to sever it and seal the adjoining severed edges to form opposed pairs of bags.

4. A mechanism for forming bags and the like from tubular thermoplastic material which comprises means for advancing a length of tubular thermoplastic sheet material over a cylindrical bag forming drum, spaced wires mounted substantially parallel to the axis of the drum to sever the thermoplastic material and seal the severed edges, means for intermittently heating the severing wires when they are at a certain location as the cylinder rotates, and a resilient roller formed of heat resisting material spaced above the wires and rotating about an axis substantially parallel to the drum to press the tubular material against the wires as they are heated and insure the formation of a leak proof seam at the looped tubular edge of the material.

5. A mechanism for forming bags and the like from thermoplastic tubular material which comprises a hollow cylindrical bag forming drum over which a length of thermoplastic material is advanced, pairs of spaced rows of holes extending axially through the surface of the drum, means for causing a pressure differential between the interior and exterior of the drum to cause flow of air through the holes and hold the thermoplastic material against the drum surface as it is carried thereon, wires spaced from the surface of the cylinder and each positioned between a pair of rows of holes and detachably secured to the cylinder in order that some of them may be detached or that others may be added or that they may be relocated and positioned between other pairs of holes so as to change the length of thermoplastic bag which is cut from the material when the wires are heated, and means to electrically heat the wires to sever bags from the thermoplastic material and to seal the severed edges.

6. A mechanism for forming bags and the like from layers of thermoplastic material comprising a cylindrical bag forming drum over which the thermoplastic material is carried, heated severing sealing wires carried on the drum and spaced from each other to sever the tubular material into lengths and to seal the severed edges to form bags, means to hold the thermoplastic material on the surface of the drum, and an air jet positioned adjacent the surface of the drum to blow tangentially thereto against the advancing thermoplastic material to separate the leading edges of the bags from the drum.

7. A mechanism for forming bags and the like of tubular thermoplastic material which comprises a hollow cylindrical bag forming drum having perforations in the surface, heated severing and sealing wires spacedly carried on the surface of the drum, means for holding the bags on the surface of the drum, and ejecting means to cause a flow of air outwardly through the perforations of the drum to discharge the bags therefrom at a certain location and a tangential jet of air blowing against the rotation of the drum to dislocate the leading edge of the bags from the drum directing them away from the surface.

8. A mechanism for forming bags and the like from tubular thermoplastic material comprising in combination a hollow cylindrical bag forming drum having perforations in the surface, means for causing a pressure differential between the interior and the exterior of the drum to hold the tubular thermoplastic material against the surface of the drum, spaced heated and sealing wires axially carried on the surface of the drum to sever lengths of the tubular material to form bags, means for directing a flow of air outwardly through the holes at a location where the bags are to be removed from the drum surface, and means for carrying the bags away from the surface of the drum comprising a pair of upper rollers carrying spaced conveyor belts, and a cooperating pair of lower rollers also carrying similarly spaced conveyor belts, the rollers and belts receiving the bags therebetween and conveying them to a location remote from the bag forming cylinder.

9. A mechanism for forming bags and the like from tubular thermoplastic material which comprises a bag forming cylindrical drum over which a length of tubular thermoplastic material is advanced, spaced heated sealing and severing wires carried on the surface of the drum to sever lengths of thermoplastic material from the tubular material and form bags, means for holding the severed bags on the surface of the drum, a bag conveying means positioned adjacent the drum comprising rollers carrying spaced conveyor belts and a cooperating pair of rollers also carrying similarly spaced conveyor belts, means for removing the bags from the surface of the cylinder and directing them between said conveyor belts, the roller being closest to the cylinder having perforations in the surface, and means for causing a pressure differential between the interior and exterior of said perforated roller to hold the bags against the surface thereof assisting in drawing them from the bag forming cylinder and to carry them between the conveyor belts.

10. A mechanism for forming bags and the like from tubular thermoplastic material comprising a hollow cylindrical bag forming drum over which a length of tubular material is advanced, spaced heated wires mounted on the surface of the drum to sever the tubular material into bags, holes in the surface of the bag forming drum, means to cause a vacuum in the interior of the drum to hold the bags and tubular material against the surface thereof, means for directing air outwardly through the holes at the location where the bags are to be removed from the drum, a bag removing conveyor positioned at the bag removing location and comprising a hollow upper cylinder carrying conveying belts which are recessed into the surface so as to be flush therewith, and a cooperating roller positioned beneath the first roller and also carrying spaced conveying belts which are recessed in surface thereof, said first roller having openings in the surface thereof, and means for creating a vacuum in the interior of said first roller to draw the bag against the surface thereof, and a tangential air jet positioned at said bag removing location to blow against the direction of bag advancement and direct the leading edge of the bags away from the drum and onto said first roller.

11. A mechanism for forming bags and the like from thermoplastic material which comprises a forming cylinder for carrying the material, means for rotating the cylinder, a plurality of axially extending heating wires circumferentially spaced and carried on the cylinder, a roller rotating about an axis parallel to the cylinder and positioned to press the edge of the material against the cylinder and wires as the drum rotates, a support for the roller with the axis of the roller being restrained in a direction tangential to the cylinder and unrestrained in a radial direction to be free to ride up on the wires as they pass and to move down against the material to press it to the drum between the wires, and means to heat the wires to sever the material.

12. A mechanism for forming bags and the like from tubular thermoplastic material in accordance with claim 4 in which a pair of resilient rollers are provided spaced apart with each engaging an edge of the tubular material to flatten the edge against the wires and insure a leakproof seam at the looped tubular edge of the material.

References Cited in the file of this patent

UNITED STATES PATENTS

| | | |
|---|---|---|
| 634,307 | Neidhardt | Oct. 3, 1899 |
| 1,496,356 | Noonan | June 3, 1924 |
| 1,765,564 | Buchanan | June 24, 1930 |
| 2,125,758 | Waters | Aug. 2, 1938 |
| 2,185,647 | Penn et al. | Jan. 2, 1940 |
| 2,444,685 | Waters | July 6, 1948 |
| 2,525,139 | Ligon | Oct. 10, 1950 |
| 2,546,164 | Norris | Mar. 27, 1951 |
| 2,577,745 | Foster | Dec. 11, 1951 |